(12) United States Patent
Vannithamby

(10) Patent No.: US 7,995,662 B2
(45) Date of Patent: Aug. 9, 2011

(54) CQI REPORTING TECHNIQUES FOR OFDMA WIRELESS NETWORKS

(75) Inventor: Rath Vannithamby, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 843 days.

(21) Appl. No.: 11/855,692

(22) Filed: Sep. 14, 2007

(65) Prior Publication Data

US 2009/0074089 A1 Mar. 19, 2009

(51) Int. Cl.
*H04K 1/10* (2006.01)
*H04L 7/00* (2006.01)
*H04L 23/02* (2006.01)
*H04B 7/208* (2006.01)

(52) U.S. Cl. ......... 375/260; 375/358; 375/377; 370/342

(58) Field of Classification Search .................. 375/224, 375/227, 260, 377, 358; 370/85.7, 203, 207, 370/210, 281, 329–330, 431, 437, 464, 468, 370/341–323, 432; 455/63.1, 67, 11, 436, 455/450, 513
See application file for complete search history.

(56) References Cited

U.S. PATENT DOCUMENTS

| | | | | |
|---|---|---|---|---|
| 7,457,588 B2 * | 11/2008 | Love et al. | .............. | 455/67.11 |
| 7,545,763 B2 * | 6/2009 | Wunder et al. | .............. | 370/319 |
| 7,773,950 B2 * | 8/2010 | Wang et al. | .............. | 455/67.13 |
| 2005/0282500 A1 * | 12/2005 | Wang et al. | .............. | 455/67.13 |
| 2006/0146856 A1 * | 7/2006 | Jung et al. | .............. | 370/431 |
| 2006/0251156 A1 * | 11/2006 | Grant et al. | .............. | 375/148 |
| 2007/0026810 A1 * | 2/2007 | Love et al. | .............. | 455/67.11 |
| 2007/0098093 A1 * | 5/2007 | Kwon et al. | .............. | 375/260 |
| 2007/0253473 A1 * | 11/2007 | Ishii et al. | .............. | 375/224 |
| 2008/0214198 A1 * | 9/2008 | Chen et al. | .............. | 455/450 |
| 2009/0028260 A1 * | 1/2009 | Xiao et al. | .............. | 375/260 |
| 2009/0196190 A1 * | 8/2009 | Li et al. | .............. | 370/252 |

FOREIGN PATENT DOCUMENTS

| | | |
|---|---|---|
| KR | 10-2005-0109009 A | 11/2005 |
| WO | 2005/060132 A1 | 6/2005 |
| WO | WO 2005/060132 | 6/2005 |
| WO | 2009/038983 A1 | 3/2009 |

OTHER PUBLICATIONS

Chisung et al., Adaptive Resource Allocation Based on channel Information in Multihop OFDM Systems, 2006, Vehicular Technology Conferenece, 2006. VTC-2006 Fall. 2006 IEEE 64th, pp. 1-5.*
International Search Report/ Written Opinion for PCT Patent Application No. PCT/US2008/075278, Mailed Feb. 25, 2009, pp. 10.

* cited by examiner

*Primary Examiner* — Tesfaldet Bocure
*Assistant Examiner* — Lawrence B Williams
(74) *Attorney, Agent, or Firm* — John F. Travis

(57) ABSTRACT

Various embodiments of the invention may use bitmaps to communicate channel quality index (CQI) information for multiple sub-channels in an orthogonal frequency division multiple access (OFDMA) wireless communications network. A base station may use bitmaps to report on whether the CQI information for each sub-channel has been under-reported or over-reported. A mobile station may use bitmaps to consolidate CQI information for multiple sub-channels into a single CQI set of parameters.

22 Claims, 6 Drawing Sheets

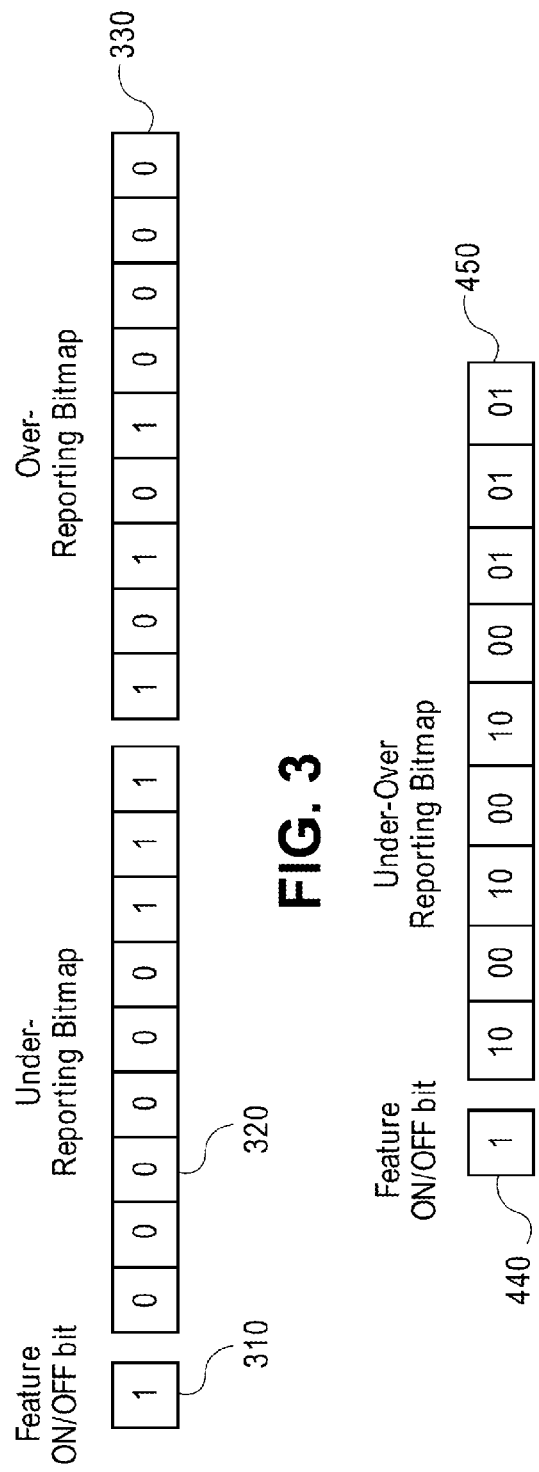

CQI REPORTING TECHNIQUES FOR OFDMA WIRELESS NETWORKS

BACKGROUND

In some types of wireless communication networks, mobile stations will report a parameter called a Channel Quality Index (CQI) to the associated base station that is controlling communications within the network. Based at least in part on the CQI values thus received, the base station can select a modulation and coding scheme (MCS) for one or more mobile stations that represents a tradeoff between higher throughput and higher failure rates of the received signals. When the mobile stations are sharing multiple sub-channels, as they are with Orthogonal Frequency Division Multiple Access (OFDMA) techniques, each mobile station can report a separate CQI value for each sub-channel. It is generally impractical for every mobile station to report on every sub-channel, so each mobile station may report on only a few of the sub-channels, typically the sub-channels for which it detects the best CQI value. However, for the base station this practice can result in too few, or no, CQI reports on some sub-channels (under-reporting), making it difficult for the base station to select an appropriate MCS for that sub-channel. Similarly, this practice can also result in too many reports on other sub-channels (over-reporting), wasting resources by transmitting more information than is necessary to select an appropriate sub-channel.

BRIEF DESCRIPTION OF THE DRAWINGS

Some embodiments of the invention may be understood by referring to the following description and accompanying drawings that are used to illustrate embodiments of the invention. In the drawings:

FIGS. 3 and 4 show example formats for sub-channel CQI status reporting bitmaps transmitted by a base station, according to various embodiments of the invention.

DETAILED DESCRIPTION

Figure 1:
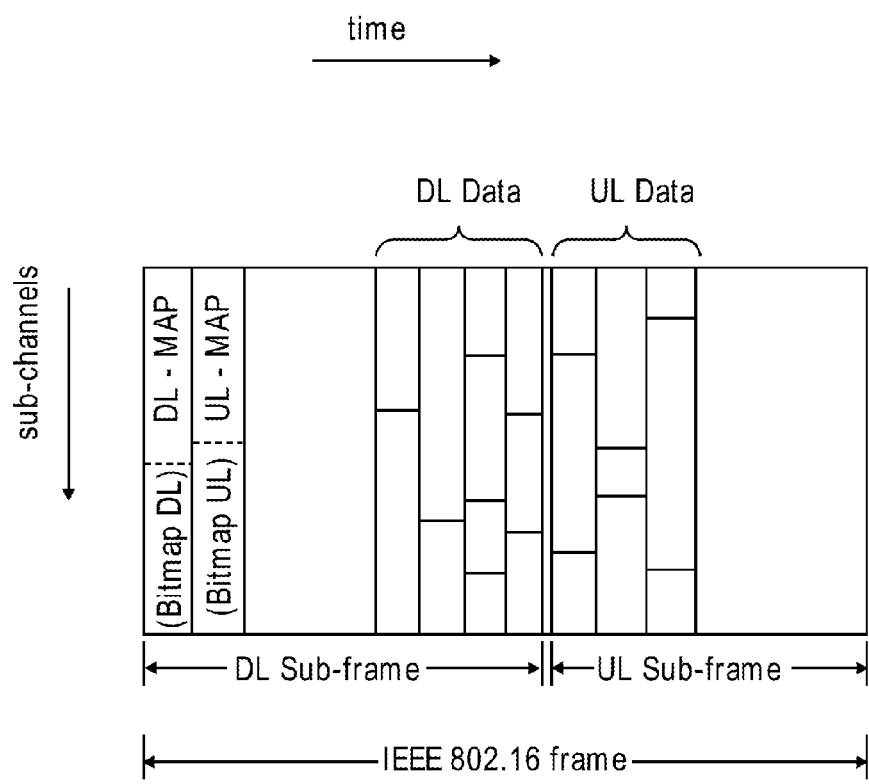
FIG. 1 shows a layout of a frame for wireless OFDMA communications, according to an embodiment of the invention.

In the following description, numerous specific details are set forth. However, it is understood that embodiments of the invention may be practiced without these specific details. In other instances, well-known circuits, structures and techniques have not been shown in detail in order not to obscure an understanding of this description.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not be in direct physical or electrical contact.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Various embodiments of the invention may be implemented in one or any combination of hardware, firmware, and software. The invention may also be implemented as instructions contained in or on a machine-readable medium, which may be read and executed by one or more processors to enable performance of the operations described herein. A machine-readable medium may include any mechanism for storing, transmitting, and/or receiving information in a form readable by a machine (e.g., a computer). For example, a machine-readable medium may include a tangible storage medium, such as but not limited to read only memory (ROM); random access memory (RAM); magnetic disk storage media; optical storage media; a flash memory device, etc. A machine-readable medium may also include a propagated signal which has been modulated to encode the instructions, such as but not limited to electromagnetic, optical, or acoustical carrier wave signals.

The term "wireless" and its derivatives may be used to describe circuits, devices, systems, methods, techniques, communications channels, etc., that communicate data by using modulated electromagnetic radiation through a non-solid medium. The term does not imply that the associated devices do not contain any wires, although in some embodiments they might not. The term "mobile wireless device" is used to describe a wireless device that may be in motion while it is communicating.

In some embodiments of the invention, channel quality information for OFDMA sub-channels is communicated between a base station and multiple mobile stations by using bit maps. As used herein, "communicating between" two devices may include transmitting by either device and/or receiving by either device. The base station may transmit one or more bit maps to describe how much the CQI information has already been reported for each sub-channel. A mobile station may transmit one or more bit maps to describe which sub-channels it is including in its report of CQI information. As used herein, a bitmap is a collection of bits in which each bit, or each group of adjacent bits, indicates whether further information is being provided about a particular sub-channel. For example, a bitmap of 30 bits can indicate whether further information is being provided for each of 30 sub-channels, by placing a 1 or a 0 in the bit position associated with each sub-channel.

FIG. 1 shows a layout of a frame for wireless OFDMA communications, according to an embodiment of the invention. The illustration of FIG. 1 generally follows the overall conventional layout used to describe an OFDMA frame, in which the vertical axis indicates the multiple sub-channels being used in parallel, and the horizontal axis indicates the passage of time, typically in increments known as symbols. Except for novel sub-fields within the DL-MAP and UL-MAP that are described later, the fields shown in FIG. 1 may comply with the specifications of the IEEE (Institute of Electrical and Electronic Engineers) standard 802.16, as published in 2007, but some embodiments may encompass devices, methods, protocols, etc. that do not totally comply with this standard.

In the illustrated frame, the first part of the frame comprises the downlink (DL) sub-frame devoted to transmissions from the base station to the mobile stations, while the last part of the frame comprises the uplink (UL) sub-frame devoted to transmissions from the mobile stations to the base station. The first part of the DL sub-frame contains a DL-MAP that tells each mobile station when and where (times and sub-channels) the mobile station can find data intended for it in the DL Data portion of the DL sub-frame, and an UL-MAP that tells each mobile station when and where (times and sub-channels) it may transmit to the base station during the UL Data portion of the UL sub-frame.

Unlike conventional systems, the DL-MAP may also contain a CQI feedback reporting field (indicated as Bitmap DL in FIG. 1), in the form of one or more bitmaps, that is used to provide the mobile stations with information on whether, or to what extent, the base station has received CQI information for each sub-channel. Each mobile station may subsequently decide, based on this information, which sub-channels to report CQI information for. For example, the base station will not allocate a particular sub-channel to a particular mobile station if that mobile station has not reported CQI for that sub-channel, since the base station would not have enough information to determine a suitable modulation and coding scheme (MCS) for that mobile station. The mobile station is thus limited to using sub-channels for which it has reported CQI information.

If the mobile station learns, through the CQI reporting field, that the base station has been under-reported, i.e. has received little or no CQI for a particular sub-channel, the mobile station may wish to report CQI for that sub-channel (providing the channel conditions are good enough for reliable communication). Since the other mobile stations have not reported on that sub-channel, and therefore cannot be allocated that sub-channel, this particular mobile station may now have a better chance of getting that sub-channel for a subsequent communication. Conversely, if a particular sub-channel has been over-reported, indicating that several other mobile stations could be allocated the sub-channel, then this particular mobile station may choose to report on other sub-channels rather than competing with those other mobile station for the subsequent use of this particular sub-channel. Thus the report of under/over-reported sub-channels lets each mobile station increase its chances of being allocated a lesser-used channel so that it won't have to compete as much for bandwidth in the network.

Figure 2:
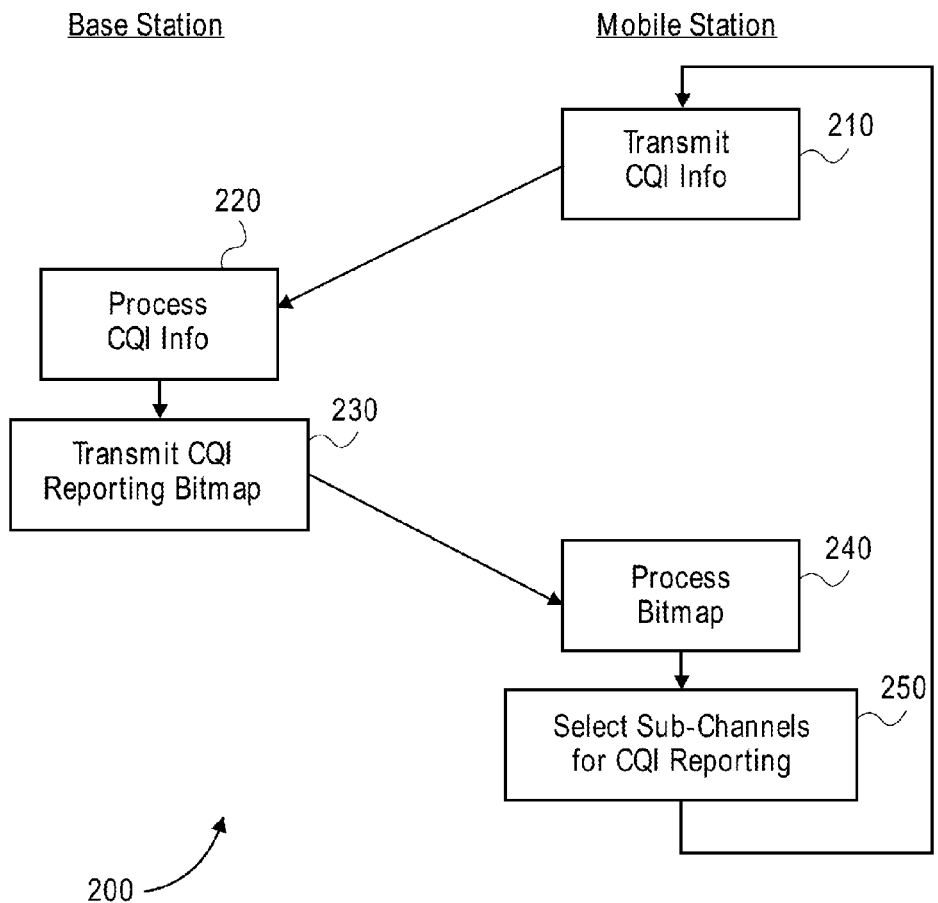
FIG. 2 shows a flow diagram of a method of communicating CQI information in a wireless network, according to an embodiment of the invention.

FIG. 2 shows a flow diagram of a method of communicating CQI information in a wireless network, according to an embodiment of the invention. Flow diagram 200 shows a series of operations performed by a base station and a mobile station in a wireless network that exchanges CQI information. At 210, after collecting channel quality information on one or more sub-channels for a period of time, the mobile station may transmit CQI information about those channels to the base station. After collecting CQI information on multiple sub-channels from multiple mobile stations, the base station may process this information at 220. The base station may then create one or more bit maps indicating the sub-channels for which it has received recent (i.e., not stale) CQI information, and/or indicating whether it has received too little, to much, or adequate CQI information on each sub-channel, and transmit the bit map(s) to the mobile stations at 230. In some operations, the bitmap(s) may be in a frame that is addressed to a selected sub-set of the mobile stations in the network. After receiving the bitmap at 240, the mobile station of this example may compare this list of sub-channel CQI information with its own needs for channel access and its own knowledge of sub-channel conditions. The mobile station may then select which sub-channels to report on at 250, and transmit that information at 210, thus starting the cycle again. As a part of this process, the mobile station may compute some probabilities that the mobile station will be allocated particular sub-channels, to decide which sub-channels to report on. Similarly, the base station may compute these probabilities and report them to the mobile stations. The mobile station may rely on its own probabilities or the base station's, or combine them in some manner.

Reporting Sub-Channel CQI Status from the Base Station

FIGS. 3 and 4 show example formats for sub-channel CQI status reporting bitmaps transmitted by a base station, according to various embodiments of the invention. In FIG. 3, two separate bitmaps are used to report on nine sub-channels. Bitmap 320 shows that sub-channels 7, 8, and 9 have been under-reported, while bitmap 330 shows that sub-channels 1, 3, and 5 have been over-reported. Since sub-channels 2, 4, and 6 are not in either bitmap, they may be assumed to be adequately reported. In other embodiments, a third bit map may be used to indicate those sub-channels that are adequately reported, to distinguish those from the sub-channels that the base station has removed from consideration. To handle legacy systems that don't have the capability to read these bitmaps, or for other reasons, the contents of indicator 310 may be used to enable or disable this reporting feature. Various thresholds may be established to define how much information the base station must receive to categorize a sub-channel as 'under-reported', 'over reported', 'adequately reported', etc.

In FIG. 4, a single bitmap 450 with two bits per sub-channel may be used to indicate even more information than the two bitmaps of FIG. 3. Since two bits allows for four different status conditions, an additional category can also be accommodated. (in this case, the category of Highly Over-Reported, but others may also be used). Using more bits per sub-channel would permit even more conditions to be reported (e.g., three bits would permit eight different status conditions). Similar to FIG. 3, indicator 440 may be used to enable or disable this reporting feature.

Figure 5:
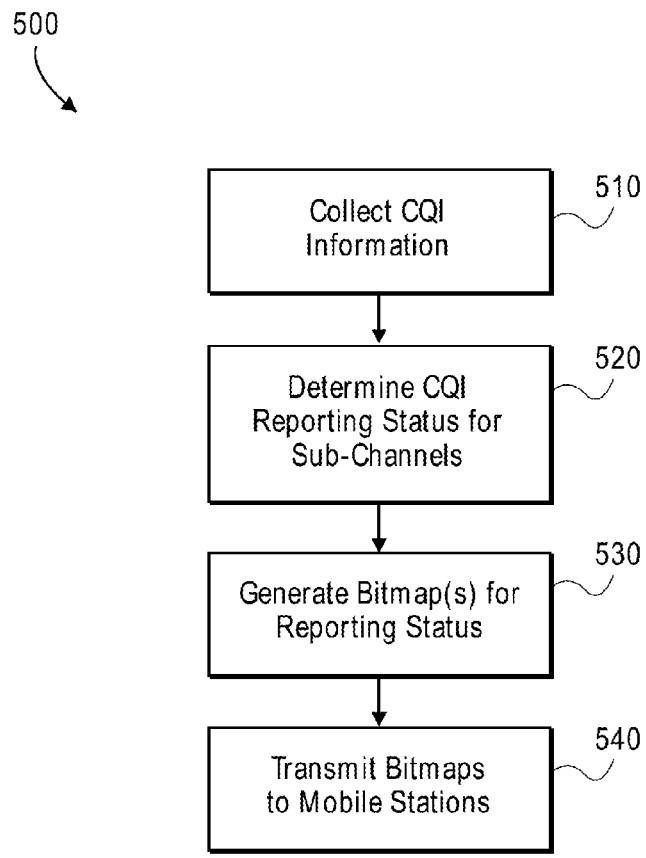
FIG. 5 shows a flow diagram of a method of processing CQI information in a base station, according to an embodiment of the invention.

FIG. 5 shows a flow diagram of a method of processing CQI information in a base station, according to an embodiment of the invention. In flow diagram 500, the base station collects CQI information on multiple sub-channels from multiple mobile stations at 510. This collection process may involve multiple frames over a period of time. After the CQI information has been collected for a sufficient period of time, at 520 the base station may use the information to determine how many CQI updates have been received for each of multiple sub-channels. A bitmap, or in some embodiments multiple bitmaps, may be generated at 530 and transmitted to the mobile stations at 540. The base station may repeat this process at sufficient intervals to keep the mobile stations updated with relatively recent information.

Reporting CQI Information from the Mobile Station

Figure 6:
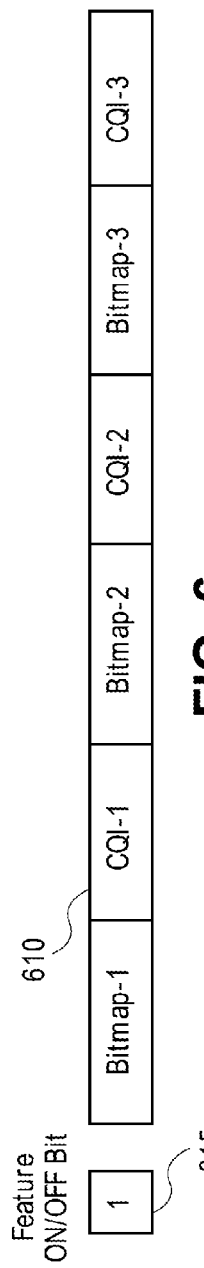
FIGS. 6, 7, and 8 show example formats for CQI information to be reported from a mobile station, according to various embodiments of the invention.
Figure 7:
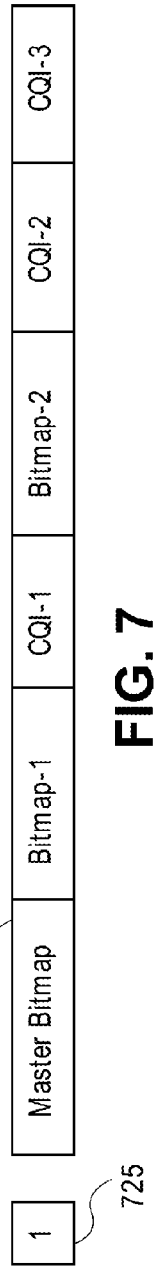
Figure 8:
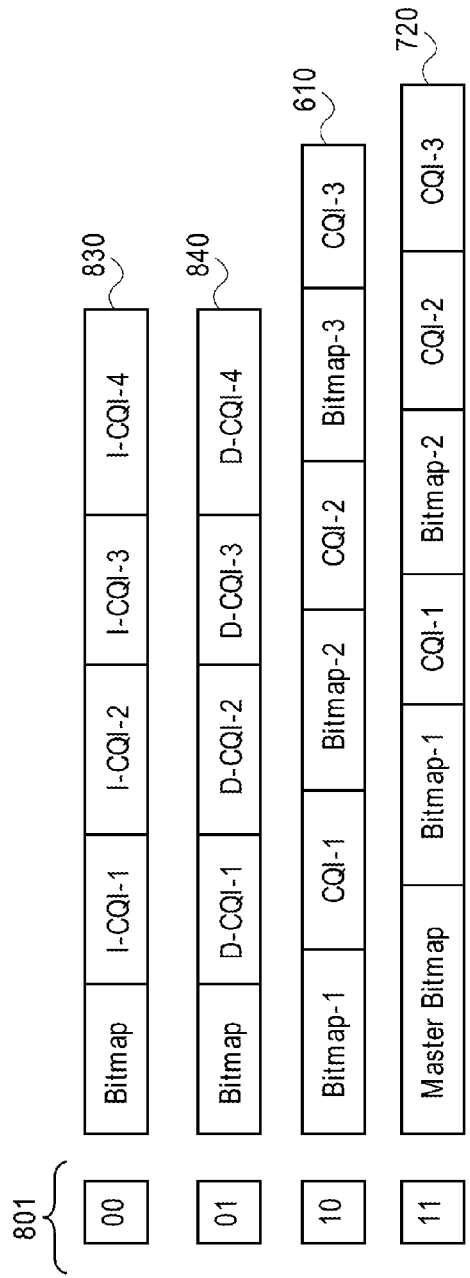

FIGS. 6, 7, and 8 show example formats with which CQI information may be reported from a mobile station, according to various embodiments of the invention. In FIG. 6, sub-channels having the same CQI information may be grouped together and reported as a group using the format 610. Bitmap-1 can indicate which of the sub-channels all have the same CQI information indicated by the parameters labeled CQI-1. Similarly, Bitmap-2 may indicate which of the sub-channels all have the same CQI information indicated by the parameters labeled CQI-2. Bitmap-3 and CQI-3 show the same information for a third group of sub-channels with a third set of CQI parameters. Although 3 sets of bitmaps/CQI parameters are shown, thus reporting on sub-channels with only three different CQI parameter sets, this format may be repeated as many times as there are different sets of CQI data to report. In this format, each bitmap may comprise as many bits as there are sub-channels to report on (e.g., if 30 sub-channels are being used in the network, each bitmap may contain 30 bits to represent each sub-channel with a '1' indicating that sub-channel has the following CQI and a '0' indicating it does not). It is not necessary to report on every sub-channel, and only those being reported on will be so indicated collectively in this format. However, the bitmap should have enough capacity to indicate all the sub-channels that it might report on.

FIG. 7 shows a different format for CQI reporting. In format 720, a Master Bitmap may indicate which of all the sub-channels are being reported on at this time. To save space (and transmission time), Bitmap-1 then only needs to be big enough to report on the sub-channels selected by the Master Bitmap. For example, if only 10 of 30 sub-channels are being reported on, the Master Bitmap would need 30 bits, but Bitmap-1 would need only 10 bits. Of those sub-channels, Bitmap-1 can indicate (e.g., with a '1' in the respective bit position) only those that have the same CQI parameters CQI-1. Bitmap 2 can be further reduced in size, since it only needs to be large enough to reference those sub-channels that were indicated by the Master Bitmap, minus the sub-channels selected by Bitmap-1. As before, the sub-channels indicated by Bitmap-2 each have the CQI parameters indicated by CQI-2. This process of reducing the size of each successive bitmap can be continued until all the sub-channels selected by the Master Bitmap have been reported on. In some embodiments, the last bitmap can be eliminated, and it will be assumed that the final CQI parameters apply to all remaining sub-channels that were indicated by the Master Bitmap but that were not selected by any of the preceding smaller bitmaps. In the example, this has been done by eliminating Bitmap-3.

As with the bitmaps of FIGS. 3 and 4, an indicator (e.g., a 1-bit field) may be used to enable or disable use of the associated format. Such a field is shown at 615 and 725. When multiple reporting formats are available, another field may be used to indicate which of those multiple reporting formats is being used. For example, in FIG. 8 a two-bit field 801 is used to select from four different reporting formats. In some embodiments, the selection may be based on current channel conditions for the mobile station. For example, current channel conditions may affect which format allows reporting the most CQI feedback, and that format may be selected. Formats 610 and 720 are shown as the same formats of FIGS. 6 and 7, respectively. Formats 830 and 840 may be other formats not previously described here, such as conventional formats already known or other novel formats. For example, format 830 represents a format that reports actual values for CQI information (I-CQI-x), while format 840 represents a format that reports the differential between the current CQI information and the previous CQI information (D-CQI-x). Either of these reporting conventions may be used on any of the reporting formats discussed herein. Even if a mobile station only has the capability of using one format, the base station may be able to recognize multiple formats. In such a case, field 801 may still be used to inform the base station which format is being used.

Figure 9:
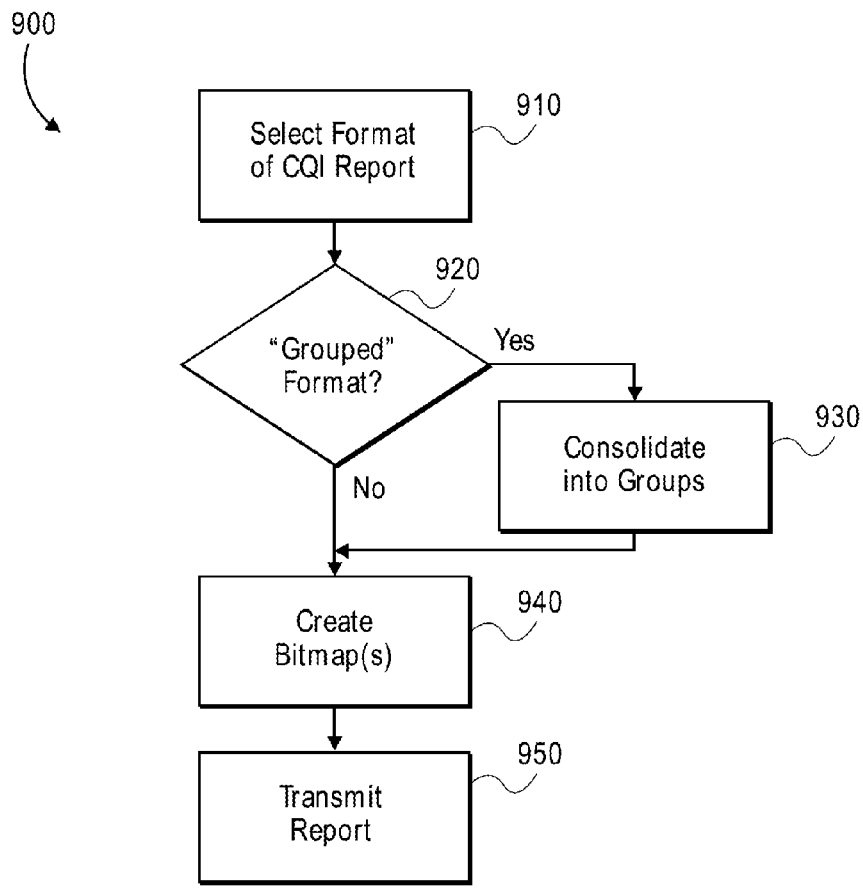
FIG. 9 shows a flow diagram of a method of reporting CQI information from a mobile station, according to an embodiment of the invention.

FIG. 9 shows a flow diagram of a method of reporting CQI information from a mobile station, according to an embodiment of the invention. In flow diagram 900, at 910 the mobile station may select a format for reporting CQI information In some embodiments, only one format may be available for use, and this selection step may be skipped. If the format to be used involves reporting on a group of sub-channels with a single set of CQI parameters, as determined at 920, then the various sub-channels may be consolidated into the proper groups at 930. FIGS. 6 and 7 show examples of such grouped formats. Whether a grouped format is used or not, one or more bitmaps may be created at 940 to indicate which sub-channels are being reported. Once the bitmaps and CQI information has been collected into the proper format, the CQI report may be transmitted at 950. Such reporting may occur during the UL sub-frame, using the time slots and sub-channels allocated to this mobile station by the base station.

The foregoing description is intended to be illustrative and not limiting. Variations will occur to those of skill in the art. Those variations are intended to be included in the various embodiments of the invention, which are limited only by the spirit and scope of the following claims.

What is claimed is:

1. An apparatus, comprising:
 a wireless communications device to be used in a wireless communication that uses orthogonal frequency division multiple access techniques for communicating a frame between a base station and multiple mobile stations, the wireless communication to contain at least one bit map indicating channel quality index (CQI) information for each of at least a portion of the multiple sub-channels;
 wherein the at least one bit map is to provide information indicating whether the CQI information for each of multiple ones of the multiple sub-channels has been under-reported or over-reported.

2. The apparatus of claim 1, wherein a frame containing the at least one bit map also contains an indicator that the at least one bit map is to be used.

3. The apparatus of claim 1, wherein the at least one bit map comprises a first bit map to indicate under-reporting and a second bit map to indicate over-reporting.

4. The apparatus of claim 1, wherein the at least one bit map comprises no more than one bit map.

5. The apparatus of claim 1, wherein the at least one bit map is contained within a downlink map used to indicate where in the frame that data for the multiple mobile stations is located.

6. The apparatus of claim 1, wherein:
 the wireless communications device is to be used as one of the mobile stations in the wireless communications network;
 the at least one bitmap is to indicate which of the multiple sub-channels has CQI information contained in a same frame as the at least one bit map; and
 a single field containing a single set of first CQI information is to be associated with multiple sub-channels indicated in one of the at least one bitmaps.

7. The apparatus of claim 6, wherein:
 the at least one bitmap comprises multiple bitmaps; and
 each of the multiple bitmaps has at least one bit position for each of all sub-channels that the base station may use in communicating with the mobile stations.

8. The apparatus of claim 6, wherein:
the at least one bit map comprises a master bitmap, a first bitmap, and second bitmap;
the master bitmap has at least one bit position for each of all sub-channels that the base station may use in communicating with the mobile stations; and
the first bitmap has at least one bit position only for each of the sub-channels being reported on as indicated by the master bitmap; and
the frame comprises a first set of CQI information associated with the sub-channels indicated by the first bitmap.

9. The apparatus of claim 8, wherein:
the second bitmap has at least one bit position only for each of the sub-channels being reported on by the master bitmap but not being reported on by the first bitmap; and
the frame contains a second set of CQI information for only those sub-channels indicated in the second bitmap.

10. The apparatus of claim 9, wherein:
the frame contains a third set of CQI information for only those sub-channels being reported on by the master bitmap but not being reported on by the first and second bitmaps; and
the frame does not contain a third bitmap directly indicating which sub-channels are associated with the third set of CQI information.

11. The apparatus of claim 6, wherein:
the mobile station is capable of transmitting the at least one bitmap and the CQI information in any of multiple formats; and
the frame contains an indicator indicating which of the multiple formats is being selected to transmit the at least one bitmap and the CQI information.

12. The apparatus of claim 11, wherein the selection is based on channel conditions.

13. A method, comprising:
determining, in a wireless communications device, a set of channel quality index (CQI) information that applies to multiple sub-channels in a wireless communications network using orthogonal frequency division multiple access; and
communicating wirelessly, between a base station and a mobile station, the CQI information and at least one bitmap indicating which of the multiple sub-channels the CQI information applies to, wherein the at least one bit map provides information indicating whether the CQI information for each of the multiple sub-channels has been under-reported or over-reported.

14. The method of claim 13, wherein the at least one bit map comprises a first bit map to indicate under-reporting and a second bit map to indicate over-reporting.

15. The method of claim 13, wherein the at least one bit map comprises no more than one bit map.

16. The method of claim 13, wherein the at least one bit map is contained within a downlink map used to indicate where in the frame that data for the multiple mobile stations is located.

17. An article comprising
a tangible machine-readable medium that contains instructions, which when executed by one or more processors result in performing operations comprising:
determining, in a wireless communications device, a set of channel quality index (CQI) information that applies to multiple sub-channels in a wireless communications network using orthogonal frequency division multiple access; and
communicating wirelessly, between a base station and a mobile station, the CQI information and at least one bitmap indicating which of the multiple sub-channels the CQI information applies to;
wherein the at least one bit map comprises a master bitmap, a first bitmap, and second bitmap, the master bitmap has at least one bit position for each of all sub-channels that the base station may use in communicating with the mobile stations, the first bitmap has at least one bit position only for each of the sub-channels being reported on as indicated by the master bitmap, and the frame comprises a first set of CQI information associated with the sub-channels indicated by the first bitmap.

18. The article of claim 17, wherein:
the wireless communications device comprises one of the mobile stations in the wireless communications network;
the at least one bitmap indicates which of the multiple sub-channels has CQI information contained in a same frame as the at least one bit map; and
a single field containing a single set of first CQI information is associated with multiple sub-channels indicated in one of the at least one bitmaps.

19. The article of claim 18, wherein each of the multiple bitmaps has at least one bit position for each of all sub-channels that the base station may use in communicating with the mobile stations.

20. The article of claim 17, wherein:
the second bitmap has at least one bit position only for each of the sub-channels being reported on by the master bitmap but not being reported on by the first bitmap; and
the frame contains a second set of CQI information for only those sub-channels indicated in the second bitmap.

21. The article of claim 20, wherein:
the frame contains a third set of CQI information for only those sub-channels being reported on by the master bitmap but not being reported on by the first and second bitmaps; and
the frame does not contain a third bitmap directly indicating which sub-channels are associated with the third set of CQI information.

22. The article of claim 18, wherein:
the mobile station is capable of transmitting the at least one bitmap and the CQI information in any of multiple formats; and
the frame contains an indicator indicating which of the multiple formats is being used to transmit the at least one bitmap and the CQI information.

* * * * *